United States Patent [19]

Schulz et al.

[11] Patent Number: 4,961,842

[45] Date of Patent: Oct. 9, 1990

[54] SIPHON GRAVITY CLASSIFIER AND CLARIFIER

[76] Inventors: Douglas K. Schulz, P.O. Box 1264, Los Lunas, N. Mex. 87031; Karl F. Meyers, P.O. Box 9, Tierra Amarilla, N. Mex. 87575

[21] Appl. No.: 267,943

[22] Filed: Nov. 7, 1988

[51] Int. Cl.$^5$ .............................................. B03B 5/00
[52] U.S. Cl. ................... 209/155; 209/158; 209/208; 209/459; 210/258; 210/523; 137/140; 137/546
[58] Field of Search ............... 209/155, 158, 208, 209, 209/210, 459, 460, 461; 210/258, 523, 525, 803; 137/140, 546

[56] References Cited

U.S. PATENT DOCUMENTS

| | | | |
|---|---|---|---|
| 982,734 | 1/1911 | Martinelli | 137/546 X |
| 1,089,606 | 3/1914 | Velten | 209/158 |
| 1,296,737 | 3/1919 | Baring-Gould | 209/209 X |
| 1,544,640 | 7/1925 | Gibbs | 209/208 X |
| 1,579,448 | 4/1926 | Homewood | 209/208 X |
| 1,727,554 | 9/1929 | Millard | 210/258 X |
| 1,948,140 | 2/1934 | Strohl | 209/155 |
| 2,360,129 | 10/1944 | Hebbard | 209/158 |

Primary Examiner—Donald T. Hajeo

[57] ABSTRACT

A device for separating liquids from solids and solids from solids is provided by utilizing a tall column filled with liquid which is subjected to a siphon action that pulls the liquid/solids mixture vertically through the column clarifying the liquid and classifying the solids. This siphon method provides a most efficient method of classification of solids and clarification of liquids. Atmospheric pressure and gravity create forces within the device which simultaneously act on every particle. The interior of the tall column has no moving parts.

10 Claims, 2 Drawing Sheets

SIPHON GRAVITY CLASSIFIER AND CLARIFIER

BACKGROUND OF THE INVENTION

Normally liquids are clarified by a combination of flocculation and decantation at atmospheric pressure. Solid/liquid mixtures are introduced to containers or tanks of sufficient size and depth to allow the solids to sink by gravity below a clear liquid level, and the liquid is then removed by overflowing the container. Often, the thickened slurries are removed from the bottoms of the clarifiers by mechanical methods such as rakes, screws, buckets, shovels, etc. The solid/liquid mixtures normally treated are metal, mineral, industrial, sewage or other materials that have been prepared for separation by processes such as screening, grinding or classifying by screw, rake or other preparatory processes.

Apart from separating liquids from solids, it is frequently required to separate the solid classes in a mixture from each other; i.e. the separation of metals from sand, marketable minerals from gangue material or coarse particles from fine ones.

Three general methods are commonly in use to separate solids from solids in a liquid medium: gravity methods, froth flotation and heavy media sink/float separation.

Gravity separation of metals and minerals is normally carried on by the use of mineral jigs, shaker tables, sluice boxes, belts and pulleys, cones, cyclones, rakes, screws, etc. Many gravity separators have relatively low throughput capacities and require high ratios of water to solids, in the range of 5:1 to 10:1 by weight. Minerals of different specific gravities are separated as they are washed across the surfaces of various devices.

Froth flotation of mineral concentrates is normally carried on in tanks or cells fitted with agitators and aerators. The liquid is treated with chemical additives to cause one mineral to sink while another floats to the surface in a froth which affects the separation of the minerals of opposite surface tension characteristics.

Heavy media sink/float separators utilize a heavy media or thickened liquid to effect a gravity separation by floating the light particles and sinking the heavy ones.

It is an object of the instant invention to remove some of the deficiencies of the above prior art by providing a device which may be produced and operated more inexpensively and which is less complex to build and operate than those of the prior art. In principal, the instant invention uses the basic technique of a siphon to pull a liquid containing solid particles vertically upward through a tall column and hence a classic siphon must be considered prior art.

To date, we have found no evidence in practice, in literature or in patents to support the fact that devices utilizing the siphon height of a liquid are in use to clarify liquids, classify solids, to comminute solids or to destroy water borne living organisms. The siphon height of a liquid is the height to which a liquid will rise under vacuum at a given barometric pressure and is approximately 34 feet (10.363 m) for water and 29.92 inches (0.760 m) for mercury at sea level.

SUMMARY OF THE INVENTION

The instant invention is comprised generally of a tall column having a height which is less than the siphon height of the subject liquid. A tube of diameter significantly smaller than the diameter of the column is attached to a hole in the top of the column and is discharged at a depth significantly lower than the liquid level of a separate reservoir provided for supplying the solid/liquid mixture to the column. The solid particles shall necessarily be of a size small enough to allow them to be drawn by suction into the device. One end of a suction tube of diameter significantly smaller than the diameter of the tall column is placed under the liquid level of the separate reservoir; the other end is attached to a hole in the side of the bottom of the tall column. Seals are provided for the distal ends of the suction and discharge tubes. The tall column and tubes are filled with liquid, and the discharge seal and suction seal are removed in that order. The falling liquid in the discharge tube causes the solid/liquid mixture in the separate reservoir to enter the column through the suction tube by siphon action. The increase in diameter of the tall column over the diameter of the suction and discharge tubes causes a reduction in velocity in the materials passing through the column. Once inside the tall column, generally, the solids fall and the liquid rises. By placing a discharge orifice on the bottom of the tall column, the solids may be withdrawn from the column by a tube of significantly smaller diameter than the suction tube with a vertical discharge point low enough to exceed the siphon height of the liquid in the tall column. The discharge end is submerged in sufficient liquid to prevent air from entering the device. Or alternatively, if the settled solids are low in quantity, the action of the device may be intermittently stopped to allow the solids to be removed through a solids discharge orifice located in the bottom center of the tall column.

These and other objects of the invention will become readily apparent as the following description is read in conjunction with the accompanying drawing wherein like reference numerals are used to refer to the view shown.

The various configurations of the instant invention are more fully described in the subject heading "Description of the Preferred Embodiments".

DESCRIPTION OF THE PREFERRED EMBODIMENTS

Figure 1:
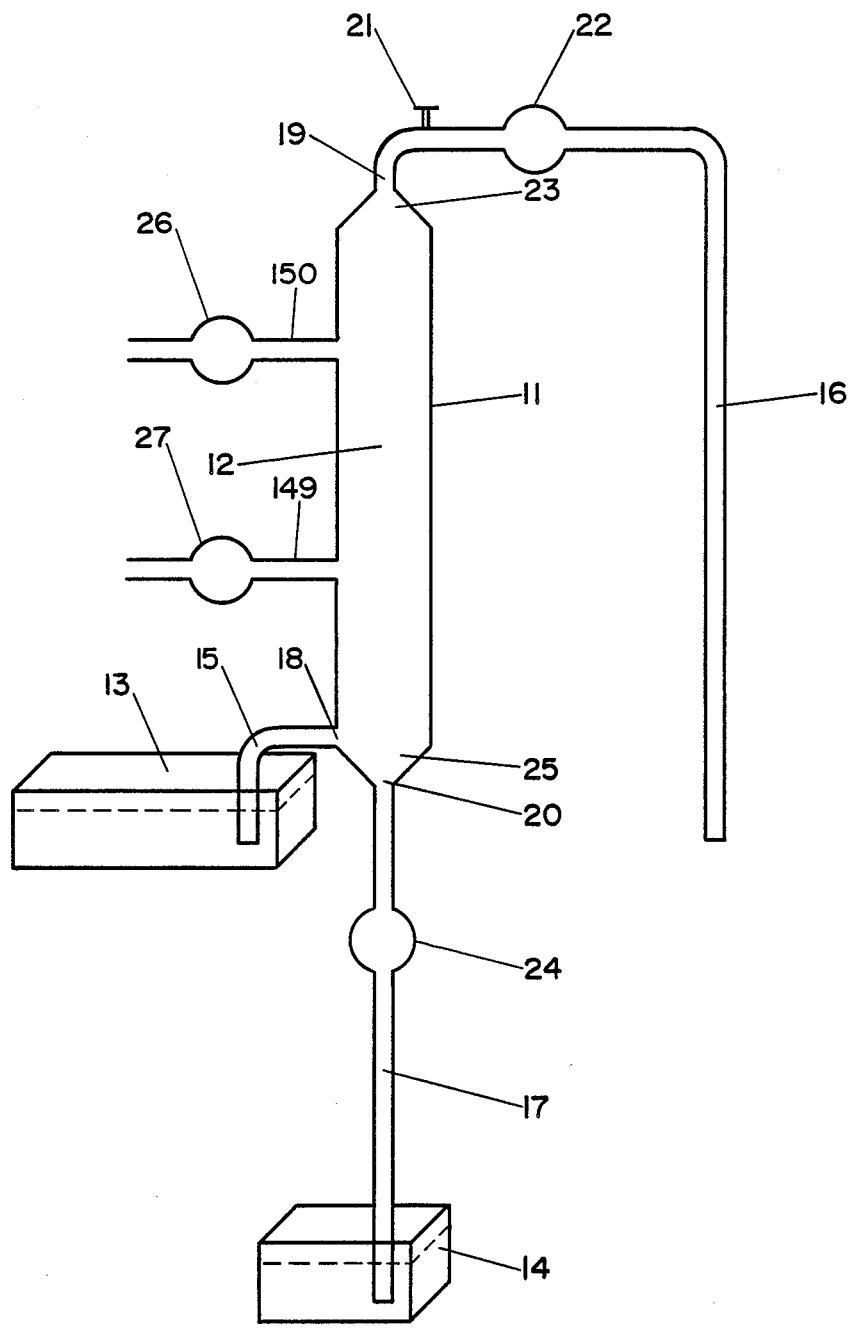
FIG. 1 is a schematic representation of the instant invention utilizing a substantially vertical tall column.

From FIG. 1 a siphon gravity classifier and clarifier, generally 11, which when used as a solids and liquid separation device is comprised of a vertical tall column 12 of sufficient height and diameter to settle all solids which enter the tall column but not so tall as to exceed the height to which the liquid which enters the tall column will rise under vacuum due to atmospheric pressure. Two separate reservoirs, 13 and 14 and three appended tubes, 15, 16 and 17 are provided. Tube 15, the intake tube, is of substantially smaller diameter than the tall column and is used to connect separate reservoir 13, which receives the initial solids and liquid mixture, to the tall column 12. The solids and liquid mixture from separate reservoir 18 is sucked by siphon action into suction tube 15 and enters the tall column through hole 18 located in the side, near the bottom of tall column 12.

Inside the tall column 12 the liquid rises and the solids fall. The thickened solids move downward to exit the tall column through hole 20 located in the center of the bottom of the tall column which is of substantially smaller diameter than the tall column. Tube 17 discharges into separate thickened solids reservoir 14 provided to keep air from entering the device by immersing the discharge end of tube 17 in liquid and being located at a level lower than the height to which the liquid may be drawn back into the column by the negative pressure inherent inside the tall column 12, wherein the liquid inside the tall column 12 rises by vacuum and passes through hole 19 located at the center top of tall column 12 into clarified liquid discharging at a level lower than the liquid level of reservoir 13 wherein by siphon action, due to atmospheric pressure, a vacuum is created inside tall column 12.

To initiate the siphon action of the instant invention, tubes 15, 16 and 17 are sealed at the distal ends by plugs or valves. Filler plug 21, at the top of the tall column 12, is removed to allow tall column 12 and the appended tubes 15, 16 and 17 to be filled with liquid along with separate reservoirs 13 and 14. When all air has been removed from tall column 12 and the appended tubes 15, 16 and 17, Filler plug 21 is replaced and the solids and liquid mixture is made to flow into reservoir 13. Care must be exercised to keep the intake end of suction tube 15 immersed in water at all times in order to prevent any air from entering the device. Simultaneously the seals are removed from the distal ends of tubes 15, 16 and 17. The liquid then moves through the tall column 12 by siphon action and any solids entering therein via suction intake tube 15 are settled by gravity and removed through the thickened solids discharge tube 17 while the clarified liquid is removed via discharge tube 16 which discharge end is placed lower than the liquid level of separate reservoir 13 thereby causing the liquid entering therein to be pulled through column 12 and discharged from tube 16 by siphon action.

To one familiar with siphons it will be apparent from FIG. 1 that a pump 22 connected to the clarifed liquid tube 16 will increase the flow of liquid through tall column 12. Further the velocity of the flow of liquid exiting the tall column will be enhanced by the forming of a cone 23 at the top of the tall column 12. Also by connecting a pump 24 to the thickened solids discharge tube 17 the discharge of solids will be enhanced. Likewise, by adding a cone 25 to the bottom of the tall column 12, the gathering of the settled solids from the column will be enhanced along with the velocity of the thickened solids exiting the tall column 12 via the thickened solids discharge tube 17.

Also from FIG. 1 it will be apparent that additional pumps 26 and 27 placed in secondary discharge tubes 150 and 149, respectively, at sites along the sides of tall column 12 will draw lighter solids from the interior of the tall column 12 than those heavier solids settling to the bottom due to the ability of pumps 26 and 27 to alter the settling rate of the lighter solids before they can settle.

Figure 2:
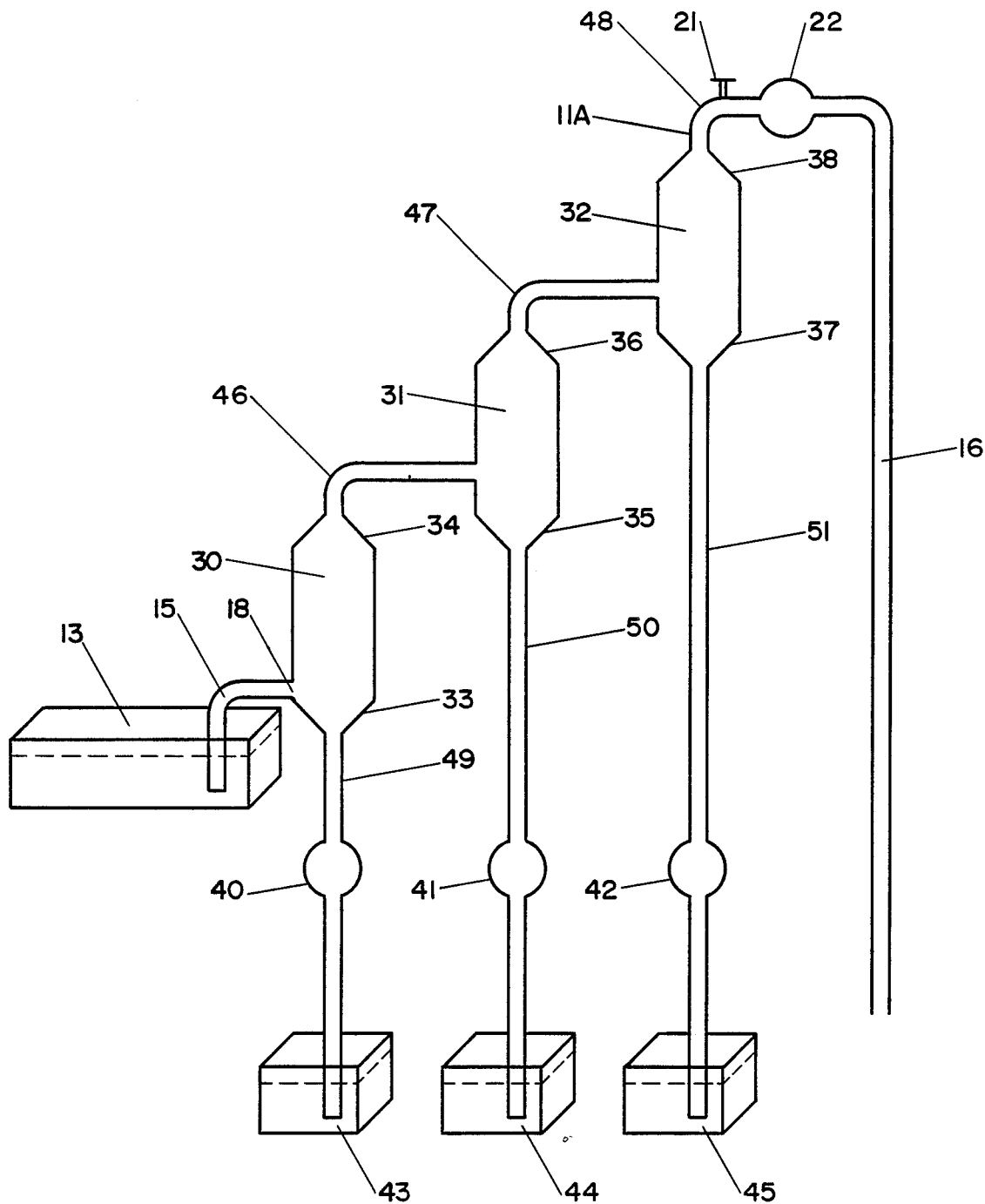
FIG. 2 is a schematic representation of the instant invention wherein the tall column is divided into segments.

FIG. 2 is a schematic representation of the instant invention, a siphon gravity clarifier and classifier, generally 11A, wherein the tall column may be divided into a plurality of columns or segments represented as 30, 31 and 32 respectively to enhance the separation of solids of different specific gravities that are introduced into separate reservoir 13 provided for receiving the solids and liquid mixture which enters column or segment 30 through intake tube 15 via the hole 18 located in the lower part of the side of segment 30. Cones 33, 35 and 37 are provided at the bottoms and cones 34, 36 and 38 are provided, at the tops of columns or segments 30, 31 and 32 respectively. The bottom cones 33, 35 and 37 enhance the settling of the thickened solids and the tip cones 34, 36 and 38 enhance the velocity of the liquid discharge exiting their respective columns or segments 30, 31 and 32.

In FIG. 2 the discharged mixture of column or segment 30 via cone 34 enters tube 46 which becomes the intake tube of segment 31. The discharged mixture of column or segment 31 via cone 36 enters tube 47 which becomes the intake tube of column or segment 32. The discharged clarified liquid of column or segment 32 via cone 38 enters tube 48 which becomes clarified liquid tube 16. When pump 22 is connected between discharge tube 48 and discharge tube 16 the vacuum created within columns or segments 30, 31 and 32 is enhanced. Likewise, when pumps 40, 41 and 42 are connected within the thickened solids discharge tubes 49, 50 and 51 respectively which exit the bottoms of column columns or segments 30, 31 and 32 respectively, the settling and solids removal rates from each of the column columns or segments are enhanced.

In FIG. 2 separate reservoirs 43, 44 and 45 are provided to receive the thickened solids discharged from column columns or segments 30, 31 and 32 respectively. Care must be taken to keep the discharge ends of thickened solids discharge tubes 49, 50 and 51 immersed in liquid at all times in separate reservoirs 43, 44 and 45 respectively which volumes of contained liquids are greater than the volumes of the thickened solid discharge tubes in order to prevent any air from entering the device due to the vacuum created inside columns or segments 30, 31 and 32 by the pull of the pumps 22, 40, 41 and 42.

From FIG. 2, to initiate the siphon action of the instant invention, generally 11A, tubes 15, 16, 43, 44 and 45 are sealed at the distal ends, filler plug 21 is removed and all cavities of 11A are filled with liquid. Separate reservoirs 13, 43, 44 and 45 are filled with liquid, the solids and liquid mixture is caused to flow into separate reservoir 13, the seal is removed from the distal end of tube 16, pump 22 is turned on and the seal is removed from the suction end of tube 15. Simultaneously the seals are removed from the distal ends of solids discharge tubes 49, 50 and 51 and pumps 40, 41 and 42 are turned on activating the instant invention. The solid particles entering the tall column are comminuted by the negative pressure created by the siphon action, and any gases which are dissolved in the liquids entering the tall column are removed from the liquid by the siphon created vacuum.

What is claimed is:

1. An apparatus for the clarification of a liquid, said apparatus comrpising:
    a first tall upright hollow cylindrical column, with vertical circular sides, said column being sealed at both ends with a single hole positioned in each end, into which a mixture of solids and liquids are drawn by a siphon created vacuum through a hole positioned in the vertical side of the hollow upright column near the bottom of the column, said column being tall enough to exceed the height to which the solids will rise, under a siphon created vacuum, but not so tall as to exceed the height to which a siphon created vacuum will draw the liquid vertically upward through the column, thereby effecting a separation of the liquid from the contained solids that enter the column as well as effecting the separation of solids of varying specific gravity that enter the column;

an intake tube, of significantly smaller diameter than the tall hollow cylindrical column, fitted on one end to the hole in the side of the column near the bottom of the column with the opposite end of the tube emplaced to serve as an intake orifice;

a separate solid and liquid reservoir, located near the bottom of the tall upright hollow cylindrical column and connected thereto by the intake tube, which reservoir is provided for receiving the solid and liquid mixture, said solid and liquid mixture being maintained in the reservoir at a liquid level high enough above the intake orifice of the intake tube so as to prevent any air from entering the tall column through the intake orifice along with the solid and liquid mixture;

a tube for discharging the clarified liquid, said tube being of significantly smaller diameter than the diameter of the tall hollow cylindrical column and attached to the hole in the top end positioned in the center at the top of the column at one end of the tube for discharging a clarified liquid from the opposite end of the discharging tube, said opposite end being at a level significantly lower than the liquid level in the separate reservoir containing the intake tube thereby allowing the clarified liquid to move by siphon action from the solid and liquid receiving reservoir through the intake tube into the tall column whereby the siphon action further causes the clarified liquid to rise vertically through the column and to exit the apparatus by way of the clarified liquid discharge tube while the thickened solids fall by gravity action to the bottom of the tall column;

a tube for discharging the thickened solids, said tube being of significantly smaller diameter than the diameter of the tall hollow cylindrical column and attached to the hole in the bottom end positioned at the center of the bottom of the column at one end of the tube and discharging at the opposite end of the tube a liquid containing those solids that fall by gravity to the bottom of the column, which tube, by design, has a discharge end which extends to a level lower than the height to which the liquid in the thickened solids discharge tube is drawn back into the column by the vacuum created in the column by the siphon action of the apparatus; a second separate reservoir for receiving liquid and thickened solids, said second reservoir placed to receive the discharge end of the thickened solids discharge tube, said second reservoir being of sufficient volume to supply a volume of liquid greater than the volume of the thickened solids discharge tube so as to prevent any air from entering the tall column through the thickened solids discharge tube.

2. The apparatus of claim 1 further comprising a means for recycling the discharged clarified liquid including a pump in the clarified liquid discharge tube at the top of the tall column to allow the clarified liquid to be pumped through said tube.

3. The apparatus of claim 1 wherein the tall column is formed into a cone at its upper end, which reduces the diameter of the column to the diameter of the discharge tube whereby the velocity of the clarified liquid exiting the column is increased.

4. The apparatus of claim 1 further comprising a pump installed in the thickened solids discharge tube, wherein the thickened solids being discharged from the tall column through the discharge tube attached to the bottom center of the bottom of the tall column are pulled through said pump thereby enabling the discharged solids to be removed at increased rates over gravity settling.

5. The apparatus of claim 1 wherein the tall column is formed as a cone at its lower end which reduces the diameter of the column to the diameter of the discharge tube whereby the velocity of the thickened solids discharge exiting the column is increased and the collection of settled solids is enhanced.

6. The apparatus of claim 1 wherein solids of decreasing specific gravity will classify according to their density by the vacuum created through the siphon action of the apparatus which allows the less dense particles to rise vertically higher through the liquid being drawn through the tall column than the more dense particles; the apparatus further includes a plurality holes placed at successively higher sites upward along the vertical sides of the column and secondary discharge tubes with pumps attached to the holes, whereby the less dense particles are discharged from increasingly higher locations from within the column via the secondary discharge tubes.

7. The apparatus of claim 1 further including at least one additional upright column of identical construction to said first upright tall column, said at least one additional column being sealed at both ends, said columns being placed in succession, with each successive column placed in series at successively higher levels and connected so that the discharge tube arising from the center of the top of a lower column enters the vertical side of the next higher column near the bottom of the column with each column having a thickened solids discharge tube at the bottom thereof for removing successively lower density solids from successively higher columns thereby effecting a separation of successively less dense solids as they are pulled by a siphon created vacuum through the columns and where the particles settle out in the columns according to their respective specific gravities.

8. The apparatus of claim 7 wherein the top and bottom ends of the segments of the tall column are formed as cones at the upper and lower ends of each segment which reduces the diameter of the tall column to the diameter of the respective discharge tubes attached thereto.

9. The apparatus of claim 1 wherein the solid particles entering the tall upright cylindrical column are comminuted by the negative pressure created by the siphon action.

10. The apparatus of claim 1 wherein any gases which are dissolved in the liquids entering the tall column are removed from the liquid by the siphon created vacuum.

* * * * *